INVENTORS
ALVIN M. MARKS
BY MORTIMER M. MARKS

ATTORNEY

United States Patent Office 3,445,153
Patented May 20, 1969

3,445,153
PHOTOPIC AND SCOTOPIC 3-DIMENSIONAL VIEWING SYSTEM
Alvin M. Marks and Mortimer M. Marks, both of 153—16 10th Ave., Whitestone, N.Y. 11357
Filed Apr. 6, 1966, Ser. No. 540,625
Int. Cl. G02b 27/22
U.S. Cl. 350—144            4 Claims

ABSTRACT OF THE DISCLOSURE

The two dimensional appearance of conventional motion picture and television displays is converted into apparent three dimensional scenes by means of a viewer which causes the observer to see with the rods in one eye and the cones in his other eye. The difference in response time between cone vision and rod vision produces the effect of viewing stereo pairs.

---

This invention relates to 3-dimensional pictures, and in particular a system for creating 3-dimensional image pairs from conventional flat television or motion picture displays.

Using the filters P and S as hereinafter described, 3-dimensional vision can be reliably obtained by individuals having two normal eyes, from conventional television or motion picture action shots.

In any picture displaying motion or "action," the foreground objects normally move more rapidly than the background objects. If there is a displacement of the image pairs produced in the eyes proportional to the image velocity on the screen, a 3-dimensional viewing effect occurs. This results in true stereoscopic vision. A sustained motion of the foreground objects relative to little or no motion in the background appears to give the best results. However, 3-dimensional vision is not obtained when the pictures in the field of view are stationary.

It was previously known to induce scotopic vision or night vision by wearing red goggles over both eyes. This was often used to increase the sensitivity of the eye for lookouts and pilots for nighttime operation.

In the prior art a relatively crude 3D effect was obtained by employing an approximately 10% neutral density filter on one eye and none on the other eye to produce under certain action conditions, stereo visual effects. The 10% neutral density decreased the relative intensity of one eye below that which cone vision is seen, thus providing rod vision in one eye, and a mixture of rod and cone vision in the other, resulting in blurred images. A 10% neutral density filter on one eye, with no filter on the other, causes excessive eye fatigue, because of the great difference in image intensity reaching the observer's eyes.

According to the present invention, special viewers are employed containing two different filters which respectively induce photopic (cone vision) in one eye and scotopic (rod vision) in the other eye. The filters hereinafter referred to as "P and S" filters, cause a spectral shift between the visual sensitivity curves of scotopic and photopic vision, known as the Purkinje shift.

Particularly effective are views of action shots such as those normally obtained in sporting events, basketball, track, motor cycle racing; as well as in ballet dancing, western outdoor pictures and the like.

With the P and S filters of this invention even the normal slight motions made by individuals on the screen are sufficent to produce a 3-dimensional effect. More active scenes actually appear to come alive and the effect is one of looking at a real scene in depth through a window provided through the frame of the TV or motion picture screen when one is far away from the screen. When one is close enough to the screen so as to provide a wide angle view, the feeling is such as to be actually participating in a scene in depth.

With scotopic or rod vision, the eye perceives only black and white and shades of gray. Photopic or cone vision provides color vision. However, with a mixture of rod vision in one eye, and cone vision in the other eye, the first eye sees using rod vision and perceives no color; that is, all vision in neutral shades of black and white; and the other eye, which sees with cone vision only, perceives color over a narrow range. One eye sees color, and the other eye sees only neutral shades. A suitable combination of P and S filters has been found to result in an apparent white.

The image displacement observed of moving images using pairs of filters to induce photopic and scotopic vision, may be explained on the basis of the known physiology of the eye. The eye has many more cones than rods. The rods are connected to single nerve fibers. The cones are more plentiful at the foveal center of the retina and the rods become more plentiful away from the fovea. The displacement observed in moving images using rod vision in one eye may be due to the different distribution of the concentration of rods and cones, or the different interconnections of rods and cones, or a difference in photochemical electrical nerve impulse response time. It is not possible at present to determine which of these explanations or combinations of explanations is the cause of this phenomena; or whether there may be some other reason.

It is also known that white light may be perceived from a mixture of colors. The eye perceives white with various mixtures of colors.

The I.C.I. chromaticity diagram (not shown) is used for plotting the locations of colors in terms of the percentage of standard red, green and blue mixtures required to match them.

However, the I.C.I. chromaticity diagram appears only to be useful for photopic vision induced by relatively high illumination. As to the conditions required for the exercise of this invention, new laws apply which have not been fully explored, and the results obtained herein are based upon observations, not previously reported.

The eye is an electro-photochemical device which responds by integrating over the entire range of colors. Moreover, the brain compares the images seen from the two eyes. Displacements between corresponding portions of the two images on the retinae are compared in the brain, and result in the perception of a 3-dimensional image. The interaction of these factors is complicated. The combination of filters discovered hereunder which induce photopic vision in one eye and scotopic vision in the other eye, produce an apparent white with balanced response, and result in stereoscopic vision, constituting a most unusual and unexpected result.

Figure 1:
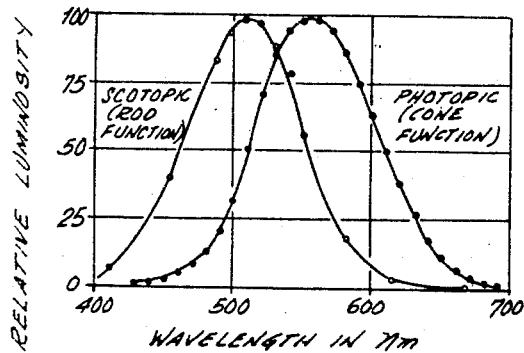
FIGURE 1 shows photoptc and scotopic relative luminosity curves of the human eye.
Figure 3:
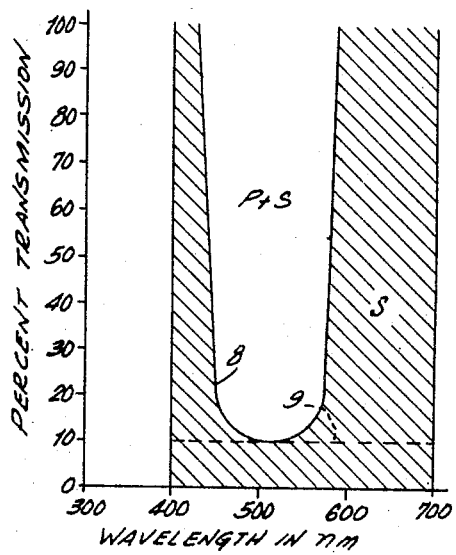
FIGURE 3 shows the data of FIGURE 2 replotted on a linear scale of relative transmittance versus wavelength for photopic and scotopic vision at a low level of illumination.
Figure 2:
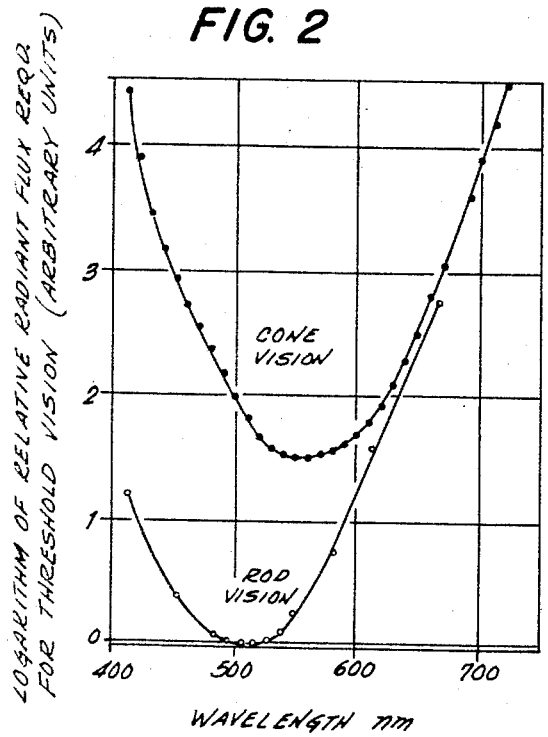
FIGURE 2 shows the relative amount of radiant flux required to stimulate the rods and cones of the human eye.

FIGURE 3 shows that for low levels of illumination, pure photopic vision is not possible. Below the curve 8 only scotopic vision occurs as indicated by the letter S in the shaded region. Above and within the curve 8 a mixture of photopic and scotopic vision occurs, indicated by the letters P and S. The line 9 represents a 10% neutral density filter placed over one eye. However, the unshielded eye sees a mixture of photopic and scotopic vision as indicated in the area within the curve 8.

The results achieved by this relatively crude prior art method were unsatisfactory because one eye saw a pure scotopic image while the other eye saw blurred images comprising superimposed photopic and scotopic images. The extreme light imbalance along with blurred images due to the mixture of photopic and scotopic vision, causes eye discomfort.

Figure 4:
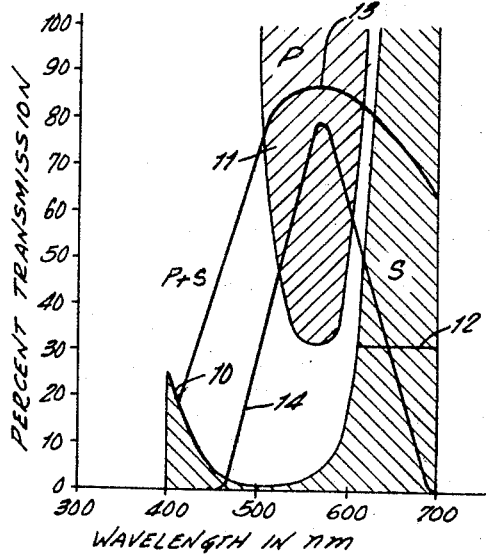
FIGURE 4 shows the same data plotted on a linear scale for an intermediate level of illumination.
Figure 5:
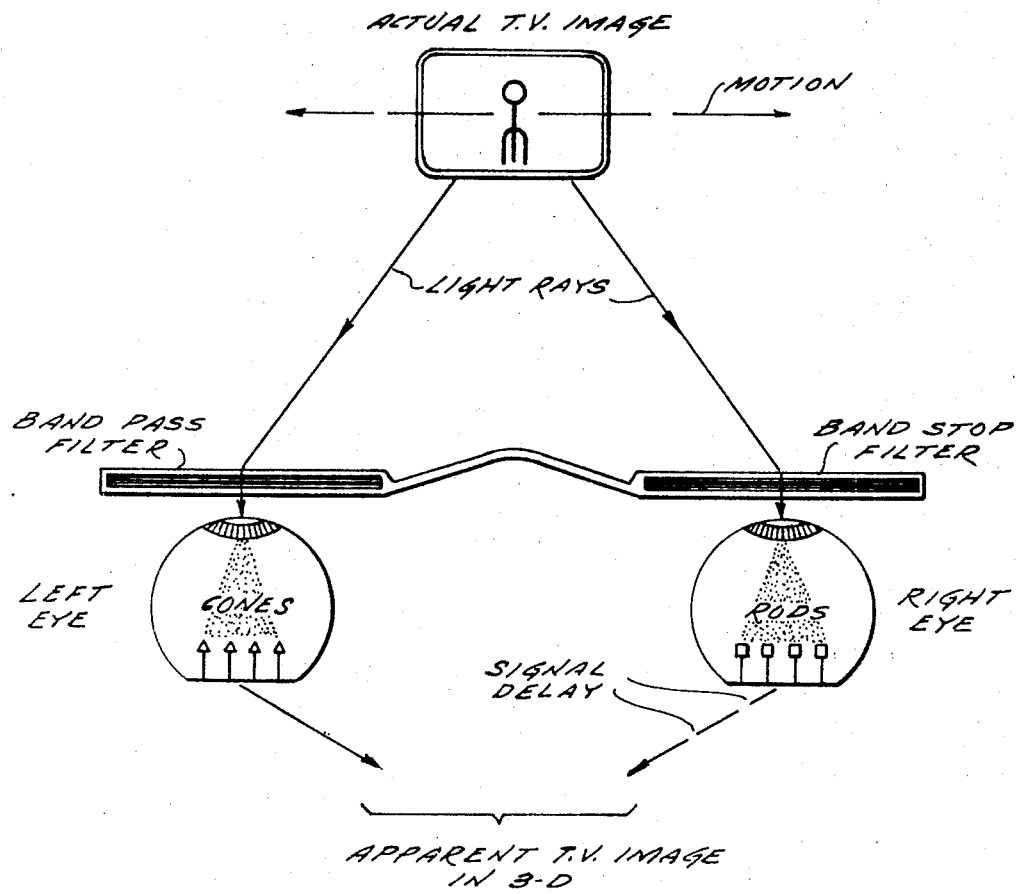
FIGURE 5 is a somewhat diagrammatic view illustrating the operation of the present device.

FIGURE 4 shows the P and S filters of the present invention at an intermediate level of illumination. The region beneath curve 10 shows the limits for scotopic vision, indicated by the shaded area S. The region within the curve 11 shows the limits for photopic vision, indicated by the shaded area P. A suitable S filter of this invention has a curve 10 and line segment 12. With this S filter over one eye, it sees with only scotopic vision. A suitable P filter of this invention ideally has a curve 13. The filter 13 is a band pass filter with a peak of 50% to preferably 85% at about 560 nm., and at 70% of peak the width extends from about 480 nm. to about 730 nm. With this filter over one eye, that eye sees almost pure photopic vision, because those portions of the spectrum which induce scotopic vision are substantially suppressed. A filter such as 13 is obtainable, for example with a dye—or $C_\mu Cl_2$—polymer layer, or the well known multilayer interference type filter. Color vision is substantially retained with this filter. (1 nanometer=$10^{-9}$ meter=1 nm.=1 millimicron=1 m$\mu$.)

Curve 14 is an absorption type filter employing a suitable dye or other colorant in solid solution in a polymer film. An example is that described in U.S. Patent No. 2,479,501 issued to Mortimer Marks on Aug. 16, 1949, comprising a film of polyvinyl acetyldehyde cupric chloride, with which the 3 dimensional effect obtained is excellent.

Other filters having similar characteristics may be substituted without departing from the scope of this invention.

The scotopic or S filter of curves 10–12 in FIGURE 4 may be obtained by the use of a conventional type 25A photographic filter plus a 25–75% neutral density filter. The addition of neutral density filter 12 assures preservation of scotopic vision in the corresponding eye. The vision transmittance of the neutral density filter is adjusted so as to provide a suitable light balance between the scotopic vision in one eye and photopic vision in the other eye.

While this filter is satisfactory, it is preferred however that the scotopic filter transmit some blue and follow the curve 10. As seen by reference to curves 10–12 in FIGURE 4, scotopic vision can be had utilizing a proportion of blue light from 400 to 475 nm. providing this blue light is a small proportion of the total illumination. This adjustment provides a somewhat greater excitation of scotopic vision that is obtainable by red light alone and enables a balance to be achieved more readily and a greater total amount of illumination from both the S and P filters. Such a red-blue-neutral filter is readily obtainable in known manner, utilizing appropriate dyes for the filters. Examples of a red-blue dyestuff are: Sudan Red 4BA and Azosol Fast Violet ERR, both manufactured by General Dye Stuffs Corp.

Without the neutral density filter a slight reddish color may be apparent using P and S filters in a viewer. However, with the red-blue curve 10 in combination with the neutral density filter 12, the picture color is approximately white.

To balance the photopic response of one eye with the scotopic response of the other eye, the integrated product of the "transmitted energy per wavelength differential" times "the photopic sensitivity at that wavelength" must equal the integrated product of the "transmitted energy per wavelengh differential" times the "scotopic sensitivity at that wavelength" resulting from use of the photopic and scotopic filters respectively. In this way the physiological response of one eye for photopic vision will be balanced by the physiological response of the other on scotopic vision.

The combination of P and S filters described in connection with FIGURE 4, using a P filter having curves 13 or 14 over one eye, and an S filter having curves 10–12 over the other eye, operating together, produce an effective sensation of white light for black and white pictures and color when used with color pictures. This combination also produces relatively satisfactory balance between the light entering the right and left eyes so that little fatigue results from prolonged use.

The system hereinabove described has been described with reference to viewers to be worn on the eye of the observer.

The photopic and scotopic filters may be mounted in spectacle frames in the usual manner. It may be preferred to utilize flat lenses and to employ a frame having hinges capable of turning through 180° so that the lenses may be reversed by the wearer from time to time. The 3D effect is maintained by such reversal which may decrease the fatigue of the wearer when these 3D glasses are to be worn for a considerable time.

Lenticular or line screens containing suitable P and S filter pairs can be placed over the screen. In this case viewers need not be worn on the eyes, but the same effect is obtained at the screen.

The only scene which do not have the 3-dimensional effect are those which are completely static. However, even still scenes can be made 3-dimensional by panning the scene while taking pictures with the movie or TV camera at the studio. This can be done by conventional panning techniques or by a steady small panning effect which can be oscillatory, and this oscillatory panning effect can be achieved with an attachment to the TV and motion picture cameras. In other respects the transmission and projection proceeds in the normal manner.

By periodically shifting the line screen as by a mechanical motion, each eye may be utilized alternatively for photopic and scotopic vision, while the other eye sees vice versa. In this manner each eye is subjected to approximately the same amount and frequency of light energy which results in even better visual performance.

Having thus fully described the invention what is claimed as new and sought to be secured by Letters Patent of the United States is:

1. A viewer for producing an illusion of three dimensional images from conventional motion picture or television displays when said picture or display is in motion comprising a support having a first filter permitting only scotopic vision in one eye which transmits a small proportion of blue light in the region 400–475 nm. and a greater proportion of red light beyond 600 nm. in combination with a neutral filter having transmittance of the order of 75% and a second filter for permitting only photopic vision in the other eye, said filter having band pass characteristics with a peak of 50%–85% at about 560 nm., and at 70% of peak having a width of between 480 nm. to 730 nm.

2. A device according to claim 1 in which the filter for producing photopic vision is a yellow green filter comprising a dye in solid solution with a polymer.

3. A viewer according to claim 1 in which the photopic filter is a yellow green filter comprising a solid solution of cupric chloride in a polymer, and the scotopic filter is a red-blue-neutral transmittance filter.

4. A device according to claim 1 in which the filter for producing scotopic vision is a red-blue-neutral transmittance filter.

References Cited

UNITED STATES PATENTS

| 1,422,527 | 7/1922 | Berger | 350—132 |
| 1,843,663 | 2/1932 | Cregier | 350—132 |
| 2,136,303 | 11/1938 | Lumiere | 350—132 |
| 2,338,298 | 1/1944 | Overhage | 350—132 |
| 2,345,777 | 4/1944 | Somers | 351—44 |
| 2,623,433 | 12/1952 | Stipek | 350—132 |

FOREIGN PATENTS

| 50,187 | 11/1940 | Netherlands. |
| 104,069 | 2/1917 | Great Britain. |

DAVID SCHONBERG, *Primary Examiner.*

PAUL R. GILLIAM, *Assistant Examiner.*